United States Patent [19]
Jaco et al.

[11] 3,997,181
[45] Dec. 14, 1976

[54] FISHERMAN'S CART

[76] Inventors: Wendell J. Jaco; Freda M. Jaco, both of 7104 E. 67th St., Kansas City, Mo. 64133

[22] Filed: Jan. 2, 1976

[21] Appl. No.: 646,362

[52] U.S. Cl. .......................... 280/47.19; 280/47.26
[51] Int. Cl.² ......................................... B62B 1/26
[58] Field of Search ................ 280/47.13 R, 47.17, 280/47.18, 47.19, 47.2, 47.24, 47.26, 47.33, DIG. 6; 273/105.6

[56] References Cited
UNITED STATES PATENTS

| | | | |
|---|---|---|---|
| 2,433,886 | 1/1948 | Bremer | 280/47.19 X |
| 2,559,951 | 7/1951 | Dunbar et al. | 280/DIG. 6 |
| 2,726,875 | 12/1955 | Murcott | 280/DIG. 6 |
| 2,820,643 | 1/1958 | Cohn | 280/47.2 X |
| 3,930,663 | 1/1976 | Scripter | 280/47.33 X |

FOREIGN PATENTS OR APPLICATIONS

| | | | |
|---|---|---|---|
| 722,429 | 1/1955 | United Kingdom | 280/DIG. 6 |

*Primary Examiner*—Joseph F. Peters
*Assistant Examiner*—R. Schrecengost
*Attorney, Agent, or Firm*—Fishburn, Gold & Litman

[57] ABSTRACT

A fisherman's cart for storage of and transporting of fishing equipment, such as fishing rods, fishing reels, tackle boxes, storage chests, and the like, includes a body member mounted on a mobile frame and having a plurality of elongated receptacles therein for receiving and storing therein elongated articles in the nature of fishing rods and having a plurality of pockets mounted on a side of the body member for receiving and storing therein articles in the nature of fishing reels and the like. The fisherman's cart has a plurality of vertically spaced shelf members hingedly mounted on another side of the frame for supporting items, such as tackle boxes, chests, and the like. The cart has a support member or stand pivotally mounted on the frame and movable between a storage position and a support position and the cart has a handle member pivotally mounted on the frame and movable between a storage position and an in-use position.

5 Claims, 4 Drawing Figures

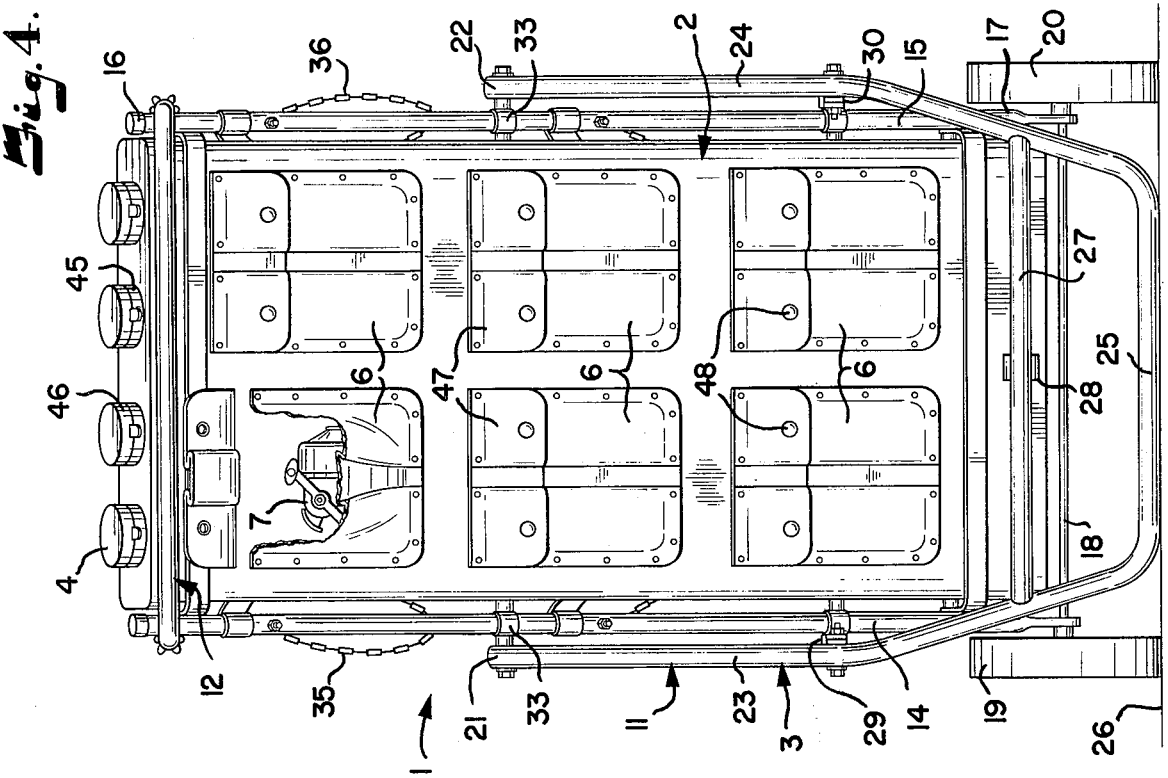
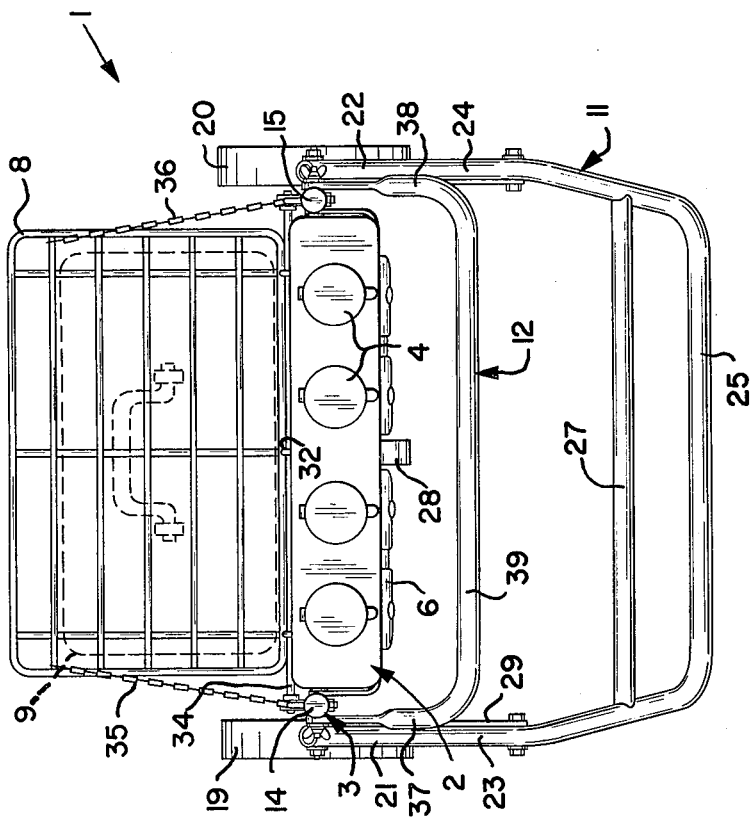

FISHERMAN'S CART

The present invention relates to fishing equipment and more particularly to a mobile fisherman's cart for storage of and transporting of fishing equipment, such as fishing rods, fishing reels, tackle boxes, storage chests and the like.

The principal objects of the present invention are: to provide a fisherman's cart particularly useful by bank fishermen for storage of and transporting of fishing equipment, such as fishing rods, fishing reels, tackle boxes, storage chests, and the like; to provide such a fisherman's cart designed to substantially reduce the number of trips from a fisherman's car or the like to a fishing site, such as a bank of a river, lake, pond, or the like and between fishing sites; to provide such a fisherman's cart wherein shelf members, a support stand, and a handle member are each movable between a storage or folded position for transporting thereof in a car, or the like, an in-use position for transporting of fishing equipment and the like; to provide such a fisherman's cart having pockets for receiving therein articles, such as fishing reels and the like and having flap portions for retaining the articles in the pockets; to provide such a fishing cart having a plurality of adjustable strap members each positioned adjacent a respective one of the shelf members for holding the items thereon; and to provide such a fishing cart which is attractive in appearance, durable in construction, easy to store in a car or the like, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the fisherman's cart.

FIG. 3 is a top plan view of the fisherman's cart taken on line 3–3 of FIG. 1.

FIG. 4 is a rear elevational view of the fisherman's cart with portions broken away to show articles stored therein.

Figure 1:
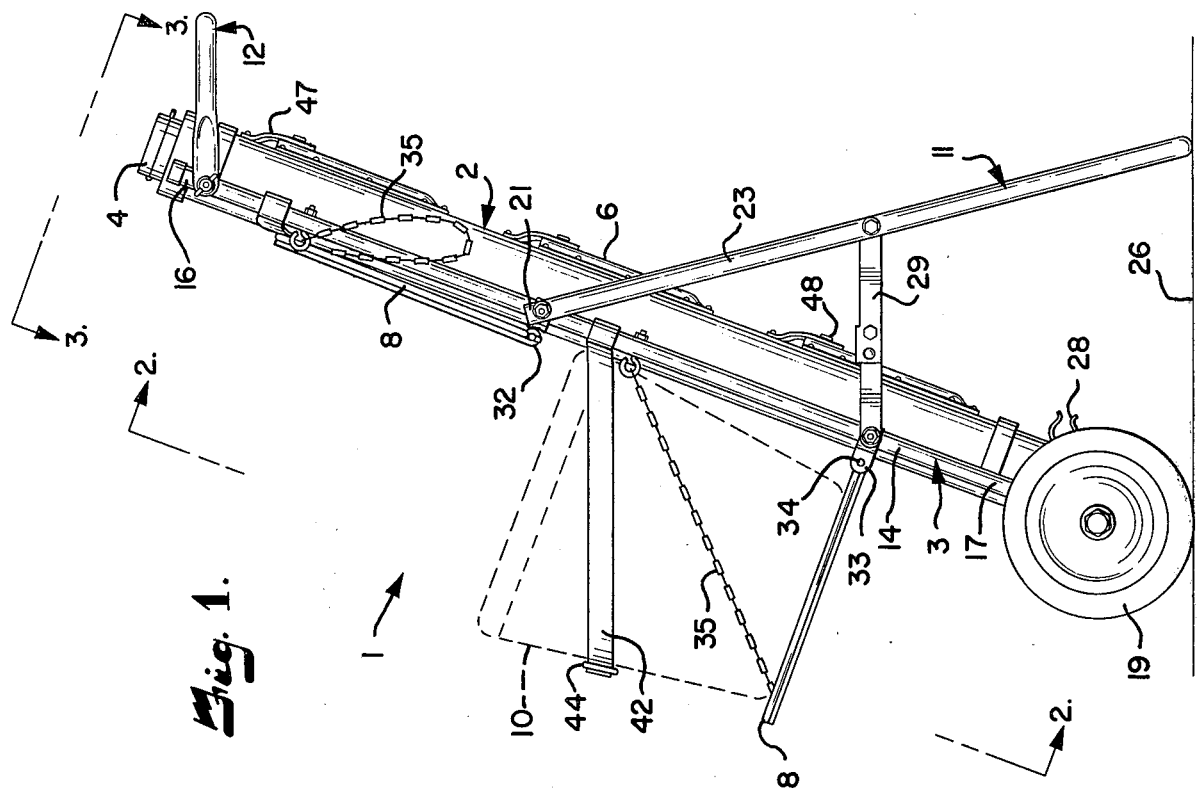
FIG. 1 is a side elevational view of a fisherman's cart embodying features of the present invention and shown in an in-use position.
Figure 2:
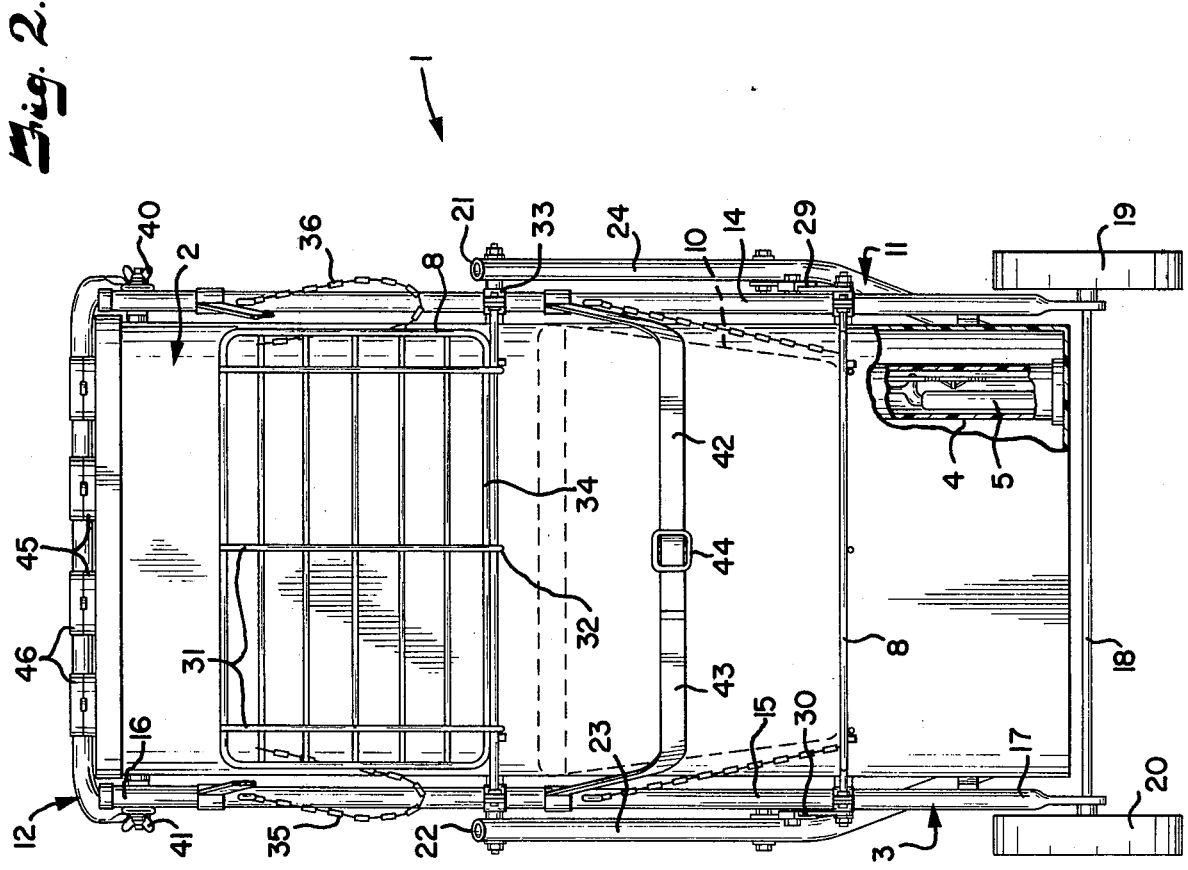
FIG. 2 is a front elevational view of a fisherman's cart taken on line 2—2 of FIG. 1 and with portions broken away to show the component parts thereof.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a fisherman's cart for storage of and transporting of fishing equipment, such as fishing rods, fishing reels, tackle boxes, storage chests, and the like. The fisherman's cart 1 includes a body member 2 mounted on a mobile frame 3 and having a plurality of elongated receptables 4 therein for receiving and storing therein elongated articles in the nature of fishing rods 5. The fisherman's cart 1 has a plurality of pockets 6 for receiving and storing therein articles in the nature of fishing reels 7 and the like. The fisherman's cart 1 has a plurality of vertically spaced shelf member 8 each mounted for supporting thereon items, such as tackle boxes 9, chests 10, and the like. The cart 1 has a support member or stand 11 pivotally mounted on the frame 3 and movable between a storage position and a support position and the cart 1 has a handle member 12 pivotally mounted on the frame 3 and movable between a storage position and an in-use position.

The frame 3 may be any suitable structure adapted to support thereon the body member 2, the receptacles 4, the pockets 6 on the body member 2, the shelf members 8, and the equipment carried thereon. The illustrated frame 3 has a pair of laterally spaced upright members 14 and 15. The frame 3 has an upper end portion 16 and a lower end portion 17 with the body member 2 positioned therebetween. The frame 3 may have suitable brace for tie members in the upper end portion 16 and the lower end portion 17 to define a substantially rigid structure.

A suitable axle member 18 is mounted on the lower end portion 17 and has opposite end portion thereof extending outwardly from the upright members 14 and 15 and having suitable wheels 19 and 20 respectively mounted thereon.

The support stand 11 has upper ends 21 and 22 of side members 23 and 24 pivotally connected to the upright members 14 and 15 respectively. The support stand 11 has an end member 25 extending between lower ends of the side members 23 and 24 and adapted to engage a suitable support surface 26, such as pavement or ground surfaces. The support stand 11 may have one or more brace or tie members 27 extending between the side members 23 and 24 and spaced from the end member 25.

The support stand 11 is movable between a storage position and an in-use position as illustrated in FIG. 1. The fisherman's cart 1 has means on one of the frame lower end portion 17 and the body member 2 for releasably holding the support stand 11 in a storage position. A clamp member 28 is mounted on the body member 2 or on the lower end portion 17 of the frame 3. The clamp member 28 is generally C-shaped and has opposed resilient arms adapted to receive therebetween the brace member 27.

The fisherman's cart 1 has means extending between and connected to the frame 2 and to the support stand 11 for holding the support stand 11 in position for supporting the frame 3. In the illustrated embodiment, foldable connection members 29 and 30 have respective opposite ends thereof pivotally connected to the side members 23 and 24 and to the upright members 14 and 15 respectively. The connection members 29 and 30 are each hinged in the center thereof and are extensible and have suitable stop means thereon to define a stable structure when in the in-use or upright position whereby the frame 3, support stand 11, and connection members 29 and 30 define a generally A-frame structure.

The shelf members 8 are longitudinally or vertically spaced along the frame 3 and are adapted to support thereon selected items, such as tackle boxes 9, storage chest 10, and the like. In the illustrated embodiment, the shelf members are each reticulated members having a plurality of laterally spaced rods 31 each having a loop portion 32, for a purpose later described. The loop portion 32 is positioned at one end of each of the rods.

The shelf members 8 are each hingedly mounted on the frame 3 and movable between a folded or storage position and in an in-use position. In the illustrated embodiment, each of the upright members 14 and 15 have a plurality of longitudinally or vertically spaced brackets 33 mounted thereon and arranged in pairs of brackets in opposed relation. The shelf members 8 are each mounted on a hinge pin 34 which extends between and has respective opposite ends thereof mounted on the brackets 33 of a respective pair of opposed brackets 33. Each hinge pin 34 extends through the loop portions 32 of the rods 31 of the respective shelf member 8 whereby each shelf member 8 is hingedly mounted on the frame 3.

Each shelf member 8 has means extending between and connected to the frame 3 and to the respective shelf member 8 for holding same in position for supporting the respective items thereon. In the illustrated embodiment, each shelf member 8 has a pair of flexible members 35 and 36 having one end portion thereof connected to the upright members 14 and 15 respectively. The flexible members 35 and 36 have the other end portion thereof connected to the respective shelf member 8. The flexible members 35 and 36 are shown as being connected to a forward edge portion of the respective shelf member 8 and positioned adjacent a respective one of the opposite side edge portions of the respective shelf member 8.

The handle member 12 is mounted on the frame 3 adjacent the upper end portion 16 thereof and the handle member 12 extends outwardly from the frame 3. The handle member 12 is movable between a storage position and an in-use position. The illustrated handle member 12 has side members 37 and 38 having one end thereof pivotally connected to the upright members 14 and 15 respectively. The handle member 12 has an end member or gripping portion 39 extending between the other ends of the side members 37 and 38. Suitable fastening devices, such as wing nuts 40 and 41, engage the side members 37 and 38 respectively to hold same in a selected position.

The fisherman's cart 1 includes means on the frame 3 adapted to hold items on the shelf members 8. In the illustrated embodiment, a plurality of strap members are longitudinally or vertically spaced along the frame 3 and each positioned adjacent and preferably above a respective one of the shelf members 8. The strap members each have a first portion 42 having one end thereof mounted on one of the upright members, for example, the upright member 14. The strap members each have a second portion 43 having one end thereof mounted on the other upright member 15. The strap members are adjustable to conform to items supported on the respective shelf member 8. A suitable buckle 44 is mounted on the outer end of one of the strap portions 42 and 43 and is adapted to adjustably retain the other strap portion therein.

The body member 2 of the fisherman's cart 1 is mounted on the frame 3 and has means therein for receiving and storing therein elongated articles in the nature of fishing rods 5. The body member 2 is preferably a unitary member of monolithic construction having a plurality of laterally spaced tubular members defining the receptacles 4. The receptacles 4 each have an upper end portion 45 thereof extending above the upper end of the body member 2. A removable cap 46 is mounted on the upper end 45 of each of the tubular receptacles 4 whereby the fishing rods 5 may be stored and retained therein.

The body member 2 also has means thereon for receiving and storing therein articles in the nature of the fishing reels 7. In the illustrated embodimemt, a plurality of panels are secured on the rear side of the body member 2 and thereby define the pockets 6. The panels are each preferably pliable material and have side edge portions and a bottom edge portion suitably secured to the body member 2. The upper edge portion of each of the panels defines an entrance to the respective pockets 6.

The body member 2 has a plurality of flap portions 47 mounted thereon and each positioned in covering relation with the entrance to the respective one of the pockets 6. The flap portions 47 each have an upper edge thereof suitably secured to the body member 2.

The flap portions 47 and the respective pocket defining panels have cooperating means thereon for releasably reataining the flap portions 47 in covering relation with the respective pocket defining panels. Suitable snaps 48 have respective portions thereof mounted on the flap portions 47 and the pockets 6.

In the present state of the sport of fishing, it is common practice for bank fishing enthusists to make more than one trip from their respective car or the like, to their selected fishing location or from one location to another in transporting the equipment and supplies used in the sport of fishing. The fisherman's cart 1 is designed primarily to alleviate such problems by providing a convenient means for the bank fishing enthusists to substantially reduce the number of trips normally required to transport such equipment and supplies over land surfaces.

The fisherman's cart may have the respective components thereof folded or moved to a storage position for transportation in a car, station wagon, truck, or the like. When removed from the respective conveyance, the shelf members are moved to the in-use position and the handle 2 is moved to a position extending from the body member 2 and the frame 3 and then the wing nuts 40 and 41 are tightened. The stand 11 is moved to a position supporting the cart 1 in an upstanding position. The various items of equipment and supplies are mounted on the shelves 8 and the strap members are secured therearound. The connection members 29 and 30 are then folded with the brace member 27 being received in the clamp 28. The cart 1 is thereby prepared for transporting equipment and supplies over land surfaces, such as from a car or the like to a selected fishing site or between fishing sites.

It is to be understood that while we have illustrated and described one form of our invention, it is not to be limited to the specific form or arrangement of parts herein described and shown.

What we claim and desired to secure by letters patent is:

1. A cart for storage of and transporting fishing equipment and comprising:
 a. a frame having an upper end portion and a lower end portion, said frame having a pair of laterally spaced upright members, each of said upright members having a plurality of longitudinally spaced brackets mounted thereon, said brackets being arranged in pairs of brackets in opposed relation;

b. wheel means mounted on the lower end portions of said frame whereby said frame is mobile;

c. a support member having one end portion thereof mounted on said frame intermediate the end portions thereof, said support member having the other end portion thereof adapted to engage a support surface;

d. means extending between and connected to said frame and to said support member for holding said support member in position for supporting said frame;

e. a plurality of shelf members longitudinally spaced along said frame for supporting items thereon;

f. an elongated hinge pin for each of said shelf members extending between and having opposite end portions thereof mounted on said brackets of said respective pair of opposed brackets, said shelf members each being reticulated members having a plurality of laterally spaced rods each having a loop portion with said respective hinge pin extending therethrough;

g. a body member mounted on said frame and having means therein for receiving and storing therein elongated articles in the nature of fishing rods; and h. means on said body member for receiving and storing therein articles in the nature of fishing reels.

2. A cart as set forth in claim 1 wherein:

a. said means for holding said shelf members in position for supporting items thereon includes a pair of flexible members for each of said shelf members;

b. each of said flexible members has one end portion thereof connected to a respective one of said upright members of said frame and an other end portion thereof connected to said respective shelf member;

c. each of said shelf members has a forward edge portion and opposite side edge portions; and d. the other end portion of each of said flexible members is connected to the forward edge portion and adjacent a respective one of the opposite side edge portions of said respective shelf member.

3. A cart for storage of and transporting fishing equipment and comprising:

a. a frame having an upper end portion and a lower end portion, said frame having a pair of laterally spaced upright members, each of said upright members having a plurality of longitudinally spaced brackets mounted thereon, said brackets being arranged in pairs of brackets in opposed relation;

b. wheel means mounted on the lower end portion of said frame whereby said frame is mobile;

c. a support member having one end portion thereof pivotally mounted on said frame intermediate the end portions thereof, said support member having the other end portion thereof adapted to engage a support surface;

d. means extending between and hingedly connected to said frame and to said support member for holding said support member in position for supporting said frame in a generally upright position;

e. a body member mounted on said frame and having means therein for receiving and storing therein elongated articles in the nature of fishing rods;

f. a plurality of pockets on said body member for receiving and storing therein articles in the nature of fishing reels, said pockets each having an entrance and a flap portion for selectively closing the entrance to said respective pocket;

g. means on one of said frame lower end portion and on said body member for releasably holding said support member in a storage position;

h. a plurality of reticulated shelf members longitudinally spaced along said frame and each hingedly mounted thereon and having means extending between and connected to said frame and to said respective shelf member for holding said shelf member in position for supporting items thereon, the mounting of said shelf members on said frame includes an elongated hinge pin for each of said shelf members and extending between and having opposite end portions thereof mounted on said brackets of said respective pair of opposed brackets on said frame, said reticulated shelf members each having a plurality of laterally spaced rods each having a loop portion with said respective hinge pin extending therethrough;

i. a handle member mounted on said frame adjacent the upper end portion thereof and extending outwardly from said frame, said handle being pivotally connected to said frame and having means engaging same for holding said handle member in a selected position; and j. a plurality of strap members longitudinally spaced along said frame and each positioned adjacent and above a respective one of said shelf members for holding the items thereon, said strap members being adjustable to conform to the items supported on said respective shelf members.

4. A cart as set forth in claim 3 wherein:

a. said means for holding said shelf members in position for supporting items thereon includes a pair of flexible members for each of said shelf members;

b. each of said flexible members has one end portion thereof connected to a respective one of said upright members of said frame and an other end portion thereof connected to said respective shelf member;

c. each of said shelf members has a forward edge portion and opposite side edge portions; and d. the other end portion of each of said flexible members is connected to the forward edge portion and adjacent a respective one of the opposite side edge portions of said respective shelf member.

5. A cart as set forth in claim 4 wherein:

a. said pockets are each defined by a respective panel having opposite side edge portions and a lower edge portion thereof secured to said body member;

b. said flap portions each have an upper edge portion thereof secured to said body member and a lower edge portion thereof in overlying relation with said respective panel; and c. said flap portions and said respective pocket defining panels have cooperating means thereon for releasably retaining said flap portions in covering relation with said respective pocket defining panels.

* * * * *